United States Patent [19]
Kinney et al.

[11] Patent Number: 5,185,626
[45] Date of Patent: Feb. 9, 1993

[54] MOUNTING ASSEMBLY FOR OPTICS TUB IN A REPRODUCTION APPARATUS

[75] Inventors: David V. Kinney, Hilton; Vincent J. O'Brien, Penfield, both of N.Y.; Daniel G. Van Sice, Tomball, Tex.

[73] Assignee: Eastman Kodak Company, Rochester, N.Y.

[21] Appl. No.: 833,255

[22] Filed: Feb. 10, 1992

[51] Int. Cl.⁵ .............................................. G03B 27/52
[52] U.S. Cl. ..................................................... 355/55
[58] Field of Search .......................... 355/55; 354/286; 359/811, 819

[56] References Cited
U.S. PATENT DOCUMENTS
2,458,269 1/1949 Huebner ................................ 355/55
4,585,308 4/1986 Negoro ............................ 355/55 X Primary Examiner—Richard A. Wintercorn
Attorney, Agent, or Firm—Lawrence P. Kessler

[57] ABSTRACT

This invention is directed to an assembly for adjustably mounting the optical system of a reproduction apparatus, having an optical system for projecting a light image of information to be reproduced on to a recording medium, relative to a frame of the reproduction apparatus. The adjustable mounting assembly comprises at least one stud supported by the frame and selectively moveable relative thereto. The optical system is clamped to at least one stud for movement therewith, the clamping mechanism including an elastomeric member for substantially isolating the optical system from any shock imparted to the frame.

9 Claims, 2 Drawing Sheets

MOUNTING ASSEMBLY FOR OPTICS TUB IN A REPRODUCTION APPARATUS

BACKGROUND OF THE INVENTION

This invention is directed in general to a mounting assembly for an optical system, and more particularly to an adjustable mounting assembly for an optics tub in a reproduction apparatus.

In reproduction apparatus, such as electrophotographic copiers or printers, for example, information to be reproduced is illuminated by a light source with the light image thereof directed onto a uniformly charged photoconductive member to expose the photoconductive member image-wise altering the charge forming a latent image charge pattern thereon. The charge pattern is then developed with pigmented marking particles. The developed image is thereafter transferred to a receiver member and fixed to the receiver member to form the desired reproduction.

Exposure of the photoconductive member is accomplished, for example, by illuminating an original document to be reproduced, and focusing the reflected light image of such document on the photoconductive member. The optical path from the original document to the photoconductive member may include an optical assembly having a lens and a number of mirrors, commonly referred to as an optics tub. The mirrors serve to bend the optical path for efficient space utilization within the reproduction apparatus. The location of the optics tub within the reproduction apparatus is critical to assure proper image formation on the photoconductive member and image reproduction.

In prior art reproduction apparatus, once the optics tub has been assembled within the reproduction apparatus, adjustment of the optics tub has been difficult because of the rest of the structure surrounding the optics tub. Further, mounting of the optics tub has been accomplished in such a way that shocks imparted to the reproduction apparatus, as in moving of the apparatus, for example, are transmitted directly to the optics tub. Such shocks can cause damage to the various components of the optics tub, or can cause the components to become relatively misaligned. This can result in objectionable defects being reproduced in the reproductions made by the apparatus.

SUMMARY OF THE INVENTION

This invention is directed to an assembly for adjustably mounting the optical system of a reproduction apparatus, having an optical system for projecting a light image of information to be reproduced on to a recording medium, relative to a frame of the reproduction apparatus. The adjustable mounting assembly comprises at least one stud supported by the frame and selectively moveable relative thereto. The optical system is clamped to the at least one stud for movement therewith, the clamping mechanism including an elastomeric member for substantially isolating the optical system from any shock imparted to the frame.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE PREFERRED EMBODIMENT

Figure 1:
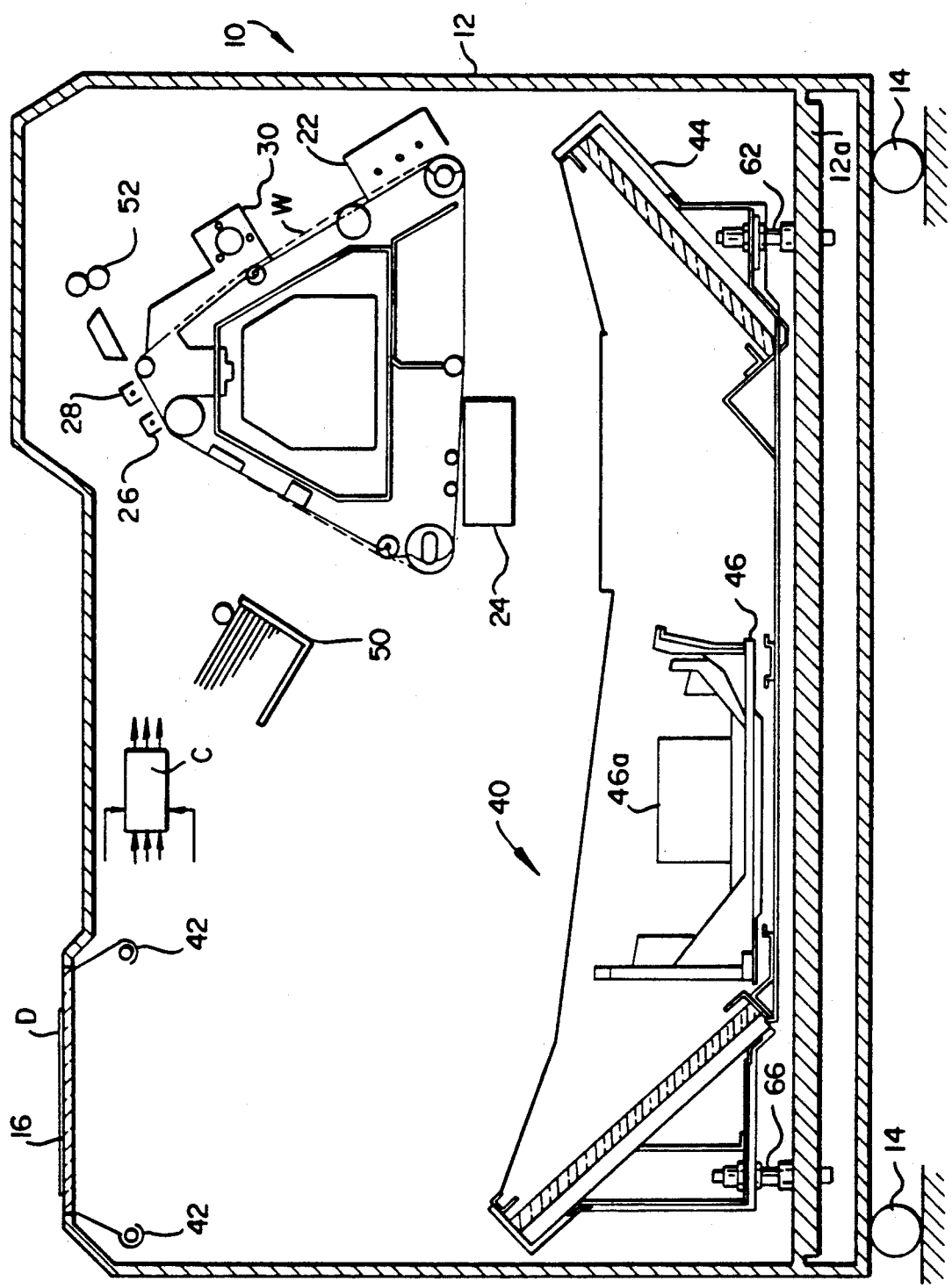
FIG. 1 is a side elevation view, in cross-section, of a typical electrophotographic reproduction apparatus containing an optics tub utilizing the adjustable mounting assembly according to this invention.

Referring now to the accompanying drawings, FIG. 1 shows an electrophotographic reproduction apparatus designated by the numeral 10. While the electrophotographic reproduction apparatus 10 will be described in sufficient detail hereinbelow for a complete understanding of how the adjustable mounting assembly for the optics tub, according to this invention, it is of course understood that the invention is suitable for use with any reproduction apparatus (copier, duplicator, etc.) employing an optical system for exposing a recording member.

The electrophotographic reproduction apparatus 10 includes a housing 12 mounted on casters 14 to facilitate movement of the apparatus. A transparent platen 16, located on the top surface of the apparatus 10, is adapted to selectively support an original document D to be reproduced. A film core 18 is supported within the housing 12. The film core 18 carries a plurality of rollers 20 to support a recording member in the form of a continuous web photoconductive member W, such as shown in Light U.S. Pat. No. 3,615,414, issued Oct. 26, 1971, for example. Additionally, the film core 18 serves to support, and locate various elements necessary to carry out the electrophotographic process. These elements include the primary charger 22, a development station 24, a transfer charger 26, a detack charger 28, and a cleaning station 30.

An optics assembly 40, located within the housing 12, is utilized to project a reflected light image of an original document to be reproduced from the platen 16 onto the photoconductive member W. The optics assembly 40 includes lamps 42 for illuminating the original document on the platen 16 and an optics tub 44 for directing the light reflected from the document, along an optical path, in focus onto the photoconductive member. The optics tub 44 comprises a support bed 46 for a lens assembly 46a and a plurality of mirrors 48 for redirecting the optical path in the desired direction from the document, onto the photoconductive member.

According to the electrophotographic process, under the control of a logic and control unit C, when a reproduction of an original document D on the platen 16 is to be made, the photoconductive member W is transported about its closed loop path. A portion of the photoconductive member W passing beneath the primary charger 22 has a uniform charge deposited thereon. Such portion then moves to an exposure area (the right-hand segment of the lower run of the closed loop path for the photoconductive member). Lamps 42 are turned on to illuminate the original document D on the transparent platen 16, and a reflected light image of the document is directed along the optical path by the optics tub 44 to the photoconductive member W where the uniform charge is altered in an image-wise fashion to form a latent image charge pattern thereon.

The portion of the photoconductive member W, now carrying the latent image charge pattern, is then transported over the development station 24 where pigmented marking particles are attracted to the latent image charge pattern to develop such pattern. As the photoconductive member is transported through the transfer station 26, the developed image is transferred, for example in an electric field, to a receiver member fed from a supply 50 into engagement with the photoconductive member W in timed relation with the image carrying portion arriving at the transfer station. After transfer, the receiver member (now bearing the developed image) is separated from the photoconductive member and transported through a fuser assembly 52 where the developed image is fixed to the receiver member, by heat and/or pressure for example, to form the desired reproduction which is then delivered to an output (not shown) for operator retrieval. After the receiver member is separated from the photoconductive member W, that portion of the photoconductive member passes through the cleaning station to remove any residual marking particle or debris to prepare that portion for reuse.

As will be appreciated, if the reflected light image of the original document D is not properly directed to expose the photoconductive member W, the developed image of such exposure will not be formed in the proper location on the photoconductive member. As such, it will not be properly registered when transferred to the receiver member. Accordingly, an unacceptable reproduction will be formed. Therefore, the initial mounting of the optics tub 44 of the optical assembly 40 for proper alignment of the optical path, and the maintaining of such alignment over time, is critical.

Figure 3:
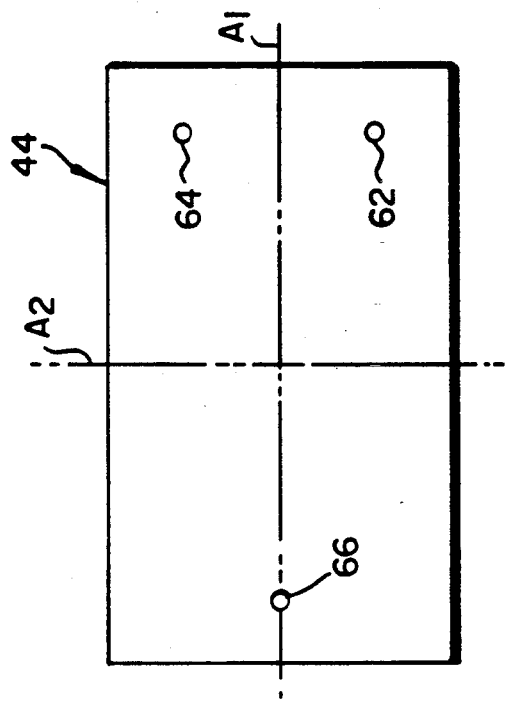
FIG. 3 is a plane view on a reduced scale of the optics tub and adjustable mounting assembly according to this invention.

According to this invention, a mounting assembly, designated generally by the numeral 60, is provided. The mounting assembly 60 includes a plurality of threaded studs 62, 64, 66 adjustably interconnecting the optics tub 44 with a frame element 12a of the reproduction apparatus housing 12. The studs are located at three spaced points so as to enable the optics tub to be adjusted about mutually perpendicular horizontal axes $A_1$ and $A_2$ through the center of the optics tub (see FIG. 3). That is, adjustment of stud 62 or 64 will rotate the optics tub about the axis $A_1$, and adjustment of studs 62 and 64 or 66 will rotate the optics tub about the axis $A_2$.

Figure 2:
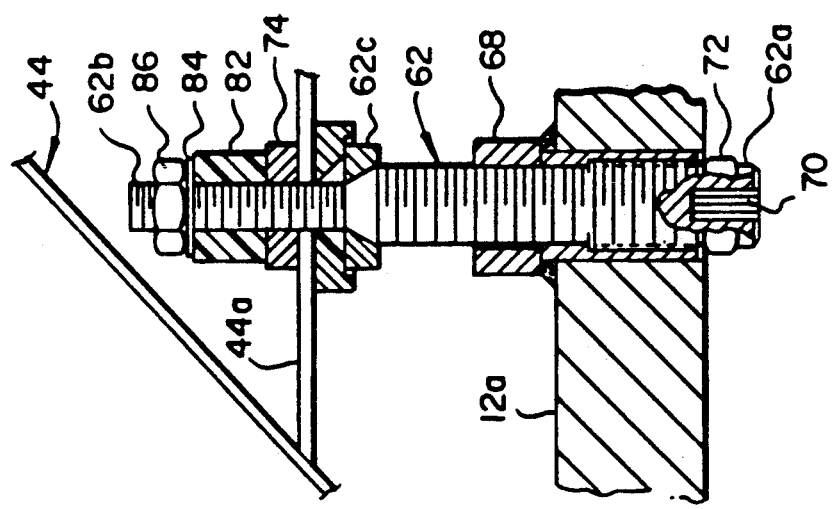
FIG. 2 is a side elevational view on an enlarged scale of the adjustable mounting assembly according to this invention.

The arrangement for stud 62 is shown and described with reference to FIG. 2. It is of course understood that the arrangements for studs 64, 66 are substantially identical and the description below applies in like manner thereto. Stud 62 has a first proximate end 62a of a first diameter, and a second proximate end 62b of a second lesser diameter, with a chamferred transition portion 62c therebetween. An internally threaded mounting pad 68 is fixed at the desired location to the frame 12a of the housing 12. The internal threads of the mounting pad 68 are complimentary to the threads of the first proximate end 62a of the stud 62. As such, the pad 68 supports the stud 62 while enabling the stud to move in its longitudinal direction relative to the pad, and thus the frame 12a, when the stud is rotated.

The first proximate end 62a of the stud 62 extends beneath the frame 12a and has a hexagonal bore 70 formed therein. An appropriately sized hexagonal wrench is readily receivable in the bore 70 to rotate the stud 62 to facilitate longitudinal movement of the stud and adjustment of the optics tub 44. As will be appreciated, such rotation of the stud 62 (and optical tub adjustment) is easily accomplished from beneath the frame 12a without necessitating removal of any components or hardware from the reproduction apparatus 10 as was the case with optics tub adjustment in prior reproduction apparatus. Once adjustment is effected by rotation of the stud 62, a locking nut 72 is threaded on proximate end 62a to hold the stud 62 in the adjusted position.

An assembly 74, at the proximate end 62b of the stud 62 opposite the end 62a, is provided for supporting the optics tub 44. The assembly 74 includes a first spherical washer 76, seated on the chamferred transition portion 62c, an internally chamferred ring 78, and a second spherical washer 80. A member 44a, integrally connected to the optics tub 44, includes a bore 82 adapted to receive the second proximate end 62b of the stud 62. The member 44a is located between the ring 78 and the second spherical washer 80.

The member 44a is held in a clamped relation between the ring 78 and the washer 80 by an elastomeric spring 82, a washer 84, and a nut 86. The elastomeric spring is for example a highly damped, crosslinked elastomeric thermosetting polyurethane material available from EAR SPECIALTY COMPOSITES Corporation of Indianapolis, Indiana. The nut 86 is threaded on the second proximate end 62b of the stud 62 and, through washer 84, provides a predetermined load on the elastomeric spring 82. With the desired preload achieved, the nut 86 is locked in position, such as by application of a chemical locking agent. The desired preload assures that the member 44a is securely clamped to the stud 62, yet provides isolation from vibration or shock imparted to the frame 12a or the reproduction apparatus. Further, the spherical nature of the washers 70 and 74 enable the member 44a to move in a plane at an angle to the perpendicular to the longitudinal axis of the stud 62. Accordingly, once the stud 62 is rotated to the degree necessary to adjust the optics tub 44, the resulting adjustment is maintained without being adversely effected by vibration or shock imparted to the reproduction apparatus.

The invention has been described in detail with particular reference to the preferred embodiment thereof, but it will be understood that variations and modifications can be effected within the spirit and scope of the invention as set forth in the claims.

We claim:

1. In a reproduction apparatus having an optical system for projecting a light image of information to be reproduced on to a recording medium, an assembly for adjustably mounting said optical system relative to a frame of said reproduction apparatus, said adjustable mounting assembly comprising:
    at least one stud;
    means for supporting said at least one stud by said frame for selective movement relative thereto; and
    means for clamping said optical system to said at least one stud for movement therewith, said clamping means including an elastomeric member for substantially isolating said optical system from any shock imparted to said frame.

2. The adjustable mounting assembly of claim 1 wherein said clamping means includes means for preloading said elastomeric member.

3. The adjustable mounting assembly of claim 2 wherein said stud supporting means includes an internally threaded pad fixed to said frame, said stud having external threads mating with said internal thread of said pad such that rotation of said stud causes said stud to move in its longitudinal direction relative to said frame.

4. The adjustable mounting assembly of claim 3 wherein said stud includes a bore formed in a readily accessible end thereof to facilitate rotation of said stud.

5. The adjustable mounting assembly of claim 1 wherein said at least one stud includes three studs located so as to provide for balanced mounting of said optical system.

6. An optical system for projecting a light image of information to be reproduced along a folded optical path, an assembly for adjustably mounting said optical system relative to a frame, said adjustable mounting assembly comprising:

a plurality of studs;

means for supporting said studs by said frame for selective movement relative thereto, said studs being arranged relative to said frame where movement of at least one stud adjusts said optical system about one axis and movement of at least one different stud adjusts said optical system about another axis substantially perpendicular to said first mentioned axis; and means for clamping said optical system to said studs for movement therewith, said clamping means including a plurality of elastomeric members associated with said studs respectively for substantially isolating said optical system from any shock imparted to said frame.

7. The adjustable mounting assembly of claim 6 wherein said clamping means includes means for preloading said elastomeric members.

8. The adjustable mounting assembly of claim 7 wherein said stud supporting means includes, for each of said studs, an internally threaded pad fixed to said frame, said stud having external threads mating with said internal thread of said pad such that rotation of said stud causes said stud to move in its longitudinal direction relative to said frame.

9. The adjustable mounting assembly of claim 8 wherein each of said studs includes a bore formed in a readily accessible end thereof to facilitate rotation of said stud.

* * * * *